(12) United States Patent
Wang et al.

(10) Patent No.: US 10,574,142 B1
(45) Date of Patent: Feb. 25, 2020

(54) DC-DC BUCK CONVERTER

(71) Applicant: NATIONAL SUN YAT-SEN UNIVERSITY, Kaohsiung (TW)

(72) Inventors: Chua-Chin Wang, Kaohsiung (TW); Chung-Jye Hsu, Kaohsiung (TW)

(73) Assignee: NATIONAL SUN YAT-SEN UNIVERSITY, Kaohsiung (TW)

( * ) Notice: Subject to any disclaimer, the term of this patent is extended or adjusted under 35 U.S.C. 154(b) by 0 days.

(21) Appl. No.: 16/059,176

(22) Filed: Aug. 9, 2018

(51) Int. Cl.
 *H02M 3/158* (2006.01)
 *H02M 1/08* (2006.01)
 *H02M 1/00* (2006.01)

(52) U.S. Cl.
 CPC ........... *H02M 3/1582* (2013.01); *H02M 1/08* (2013.01); *H02M 2001/0003* (2013.01)

(58) Field of Classification Search
 CPC .............................. H02M 3/1582; H02M 1/08
 See application file for complete search history.

(56) References Cited

U.S. PATENT DOCUMENTS

| 2008/0198638 | A1* | 8/2008 | Reinberger | ......... | H02M 3/3376 363/74 |
| 2010/0026095 | A1* | 2/2010 | Phadke | ................ | H02M 3/285 307/31 |

OTHER PUBLICATIONS

Chua-Chin Wang et al., An On-chip PWM-based DC-DC Buck Converter Design with High-efficiency Light Load Mode Operation, ICEEI2018, Jun. 28, 2018.

* cited by examiner

*Primary Examiner* — Adolf D Berhane
*Assistant Examiner* — Kevin H Sprenger
(74) *Attorney, Agent, or Firm* — Jackson IPG PLLC; Demian K. Jackson

(57) ABSTRACT

A DC-DC buck converter includes a buck conversion circuit, a PWM control circuit and a light-load control circuit. A switching circuit in the buck conversion circuit includes multiple upper switching elements and lower switching elements. The PWM control circuit is coupled to the buck conversion circuit and output a control signal to control the upper and lower switching elements. The light-load control circuit, coupled to the PWM control circuit and the buck conversion circuit for receiving an output voltage, the control signal and a light-load threshold value. The light-load control circuit is provided to determine whether the DC-DC buck converter is in a light load state and turn off at least one of the upper switching elements and at least one of the lower switching elements in the light load state.

17 Claims, 3 Drawing Sheets

DC-DC BUCK CONVERTER

FIELD OF THE INVENTION

This invention generally relates to a DC-DC buck converter, and more particularly to a DC-DC buck converter capable of improving conversion efficiency in a light load state.

BACKGROUND OF THE INVENTION

As electronic devices become increasingly complex, there are more sub-circuits in electronic devices. Each of the sub-circuits may require different voltage to other sub-circuits and external power supply, for this reason, electronic devices need multiple DC-DC voltage converting circuits to convert voltage. DC-DC voltage converting circuits have various types such as DC-DC buck converter, DC-DC boost converter and inverse DC-DC converter. And according to circuit operation, there are isolated converter, non-isolated converter, forward converter and flyback converter. Conversion efficiency of DC-DC converter is crucial, and power controlling is the popular method to improve the conversion efficiency of the conventional DC-DC converter, e.g. pulse width modulation (PWM), pulse frequency modulation (PFM), pulse skipping, burst mode and off-time modulation.

SUMMARY

The primary object of the present invention to turn off some switching elements by a light-load control circuit when the DC-DC buck converter is in the light load state, such that can improve conversion efficiency of the DC-DC buck converter in light load.

A DC-DC buck converter of the present invention includes a buck conversion circuit, a PWM control circuit and a light-load control circuit. The buck conversion circuit includes a switching circuit and a LC circuit, and there are multiple upper switching elements and multiple lower switching elements electrically connected with each other in the switching circuit. The LC circuit is electrically connected to the switching circuit and designed to output an output voltage. The PWM control circuit is coupled to the buck conversion circuit and designed to generate a control signal for controlling the upper and lower switching elements. The light-load control circuit is coupled to the PWM control circuit and the buck conversion circuit and is provided to receive the output voltage, the control signal and a light-load threshold. The light-load control circuit can determine whether the DC-DC buck converter is in a light load state based on the output voltage and the light-load threshold, and can turn off at least one of the upper switching elements and at least one of the lower switching elements when the DC-DC buck converter is in the light load state.

In the present invention, the light-load control circuit is used to determine the DC-DC buck converter is in a light load state or not, and is also used to turn off some of the upper and lower switching elements in the light load state. Consequently, conversion efficiency improvement of the DC-DC buck converter by loss reduction is available during light load.

DETAILED DESCRIPTION OF THE INVENTION

Figure 1:
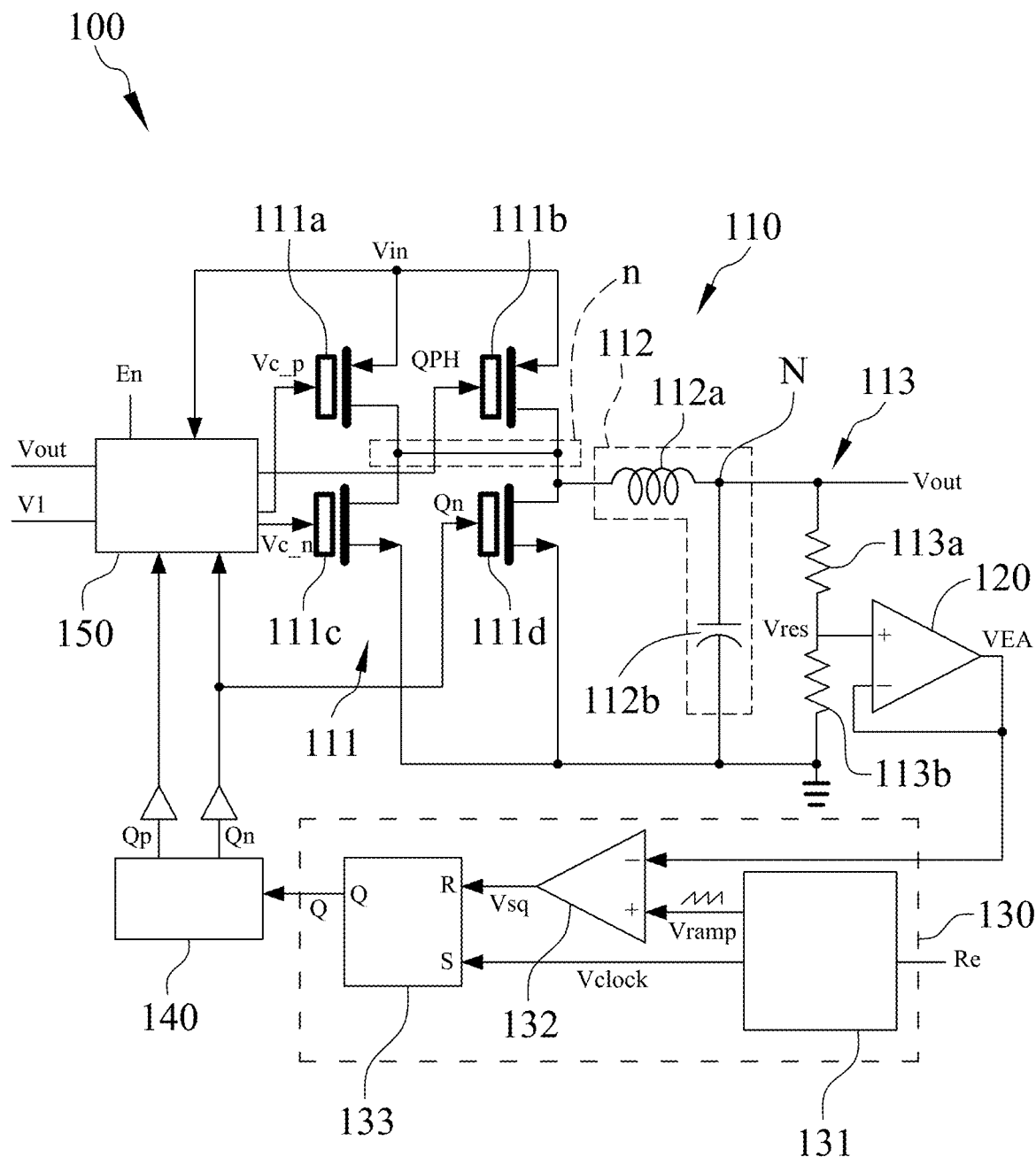
FIG. 1 is a circuit diagram illustrating a DC-DC buck converter in accordance with one embodiment of the present invention.

With reference to FIG. 1, a DC-DC buck converter 100 of one embodiment of the present invention includes a buck conversion circuit 110, an error amplifier 120, a pulse width modulation (PWM) control circuit 130, a dead-time circuit 140 and a light-load control circuit 150. The error amplifier 120 is electrically connected to the buck conversion circuit 110, the PWM control circuit 130 is electrically connected to the error amplifier 120, the dead-time circuit 140 is electrically connected to the PWM control circuit 130, and the light-load control circuit 150 is electrically connected to the dead-time circuit 140 and the buck conversion circuit 110.

With reference to FIG. 1, the buck conversion circuit 110 includes a switching circuit 111, a LC circuit 112 and a voltage divider circuit 113. There are a first upper switching element 111a, a second upper switching element 111b, a first lower switching element 111c and a second lower switching element 111d in the switching circuit 111. The first upper switching element 111a and the second upper switching element 111b are provided to receive an input voltage Vin. The first lower switching element 111c and the second lower switching element 111d are electrically connected with the first upper switching element 111a, the second upper switching element 111b and a ground end. The LC circuit 112 is electrically connected to the switching circuit 111 and the ground end, and the voltage divider circuit 113 is electrically connected with the LC circuit 112 and the ground end.

In this embodiment, the first upper switching element 111a is composed of twelve PMOS power transistors connected in parallel, the second upper switching element 111b is composed of eighteen PMOS power transistors connected in parallel, the first lower switching element 111c is composed of twelve NMOS power transistors connected in parallel, and the second lower switching element 111d is composed of eighteen NMOS power transistors connected in parallel. The optimal number of the power transistors in each of the switching elements is determined by the rated current required for the buck conversion circuit 110, and there is no limitation in the present invention regarding the number of the power transistors. The first upper switching element 111a and the second upper switching element 111b receive the input voltage Vin from their source ends and are electrically connected to a node n by their drain ends. The first lower switching element 111c and the second lower switching element 111d are electrically connected to the node n via their drain ends and electrically connected to the ground end via their source ends.

With reference to FIG. 1, the LC circuit 112 includes an inductor 112a and a capacitor 112b. Two ends of the inductor 112a are respectively electrically connected with the node n and an output node N, and two ends of the capacitor 112b are electrically connected to the output node N and the ground end respectively, and the LC circuit 112 output an output voltage Vout from the output node N. While the first upper switching element 111a or the second upper switching element 111b is turned on, the first lower switching element 111c and the second lower switching element 111d are turned off, so that the input voltage Vin charges the LC circuit 112 through the first upper switching element 111a or the second upper switching element 112b. Conversely, the first upper switching element 111a and the second upper switching element 111b are turned off when the first lower switching element 111c or the second lower switching element 111d is turned on, and the LC circuit 112 discharges to the load via the output node N. As a result, the switching circuit 110 can utilize the current continuity of the inductor 112a and the voltage continuity of the capacitor 112b to reduce the input voltage.

With reference to FIG. 1, the voltage divider circuit 113 is electrically connected to the LC circuit 112, and in this embodiment, the voltage divider circuit 113 includes a first resistor 113a and a second resistor 113b which are connected in series between the output node N and the ground end. The voltage divider circuit 113 is provided to divide the output voltage Vout to a reference signal Vres.

Figure 2:
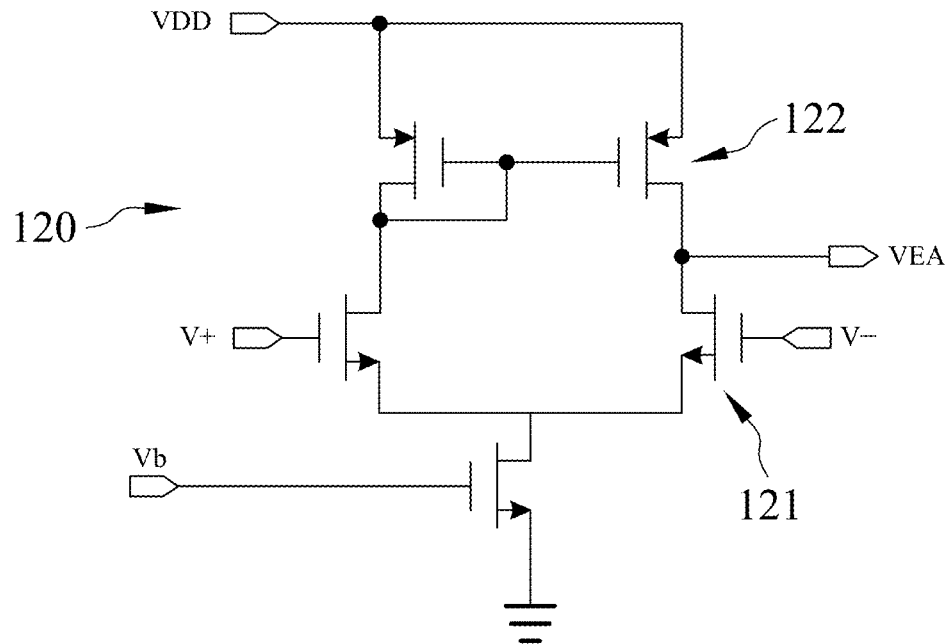
FIG. 2 is a circuit diagram illustrating an error amplifier in accordance with one embodiment of the present invention.

With reference to FIGS. 1 and 2, the error amplifier 120 is electrically connected to the voltage divider circuit 113 in order to receive the reference signal Vres. As shown in FIG. 2, the error amplifier 120 in this embodiment includes a differential pair 121 and a current mirror 122. The error amplifier 120 is configured to prevent the current output from the buck conversion circuit 110 from flowing to the PWM control circuit 130 and stabilize the voltage of the reference signal Vres. Otherwise, the error amplifier 120 is designed to output an error amplifying signal VEA.

With reference to FIG. 1, the PWM control circuit 130 includes a signal generator 131, a comparator 132 and a latch 133. The signal generator 131 is used to generate a triangular wave signal Vramp and a clock signal Vclock. The comparator 132 is electrically connected with the error amplifier 120 and the signal generator 131 for receiving the error amplifying signal VEA and the triangular wave signal Vramp, and is provided to output a square wave signal Vsq by comparing the potential of the error amplifying signal VEA and the triangular wave signal Vramp. The latch 133 is electrically connected to the comparator 132 and the signal generator 131 for receiving the square wave signal Vsq and the clock signal Vclock, and is adapted to output a control signal Q.

Figure 3:
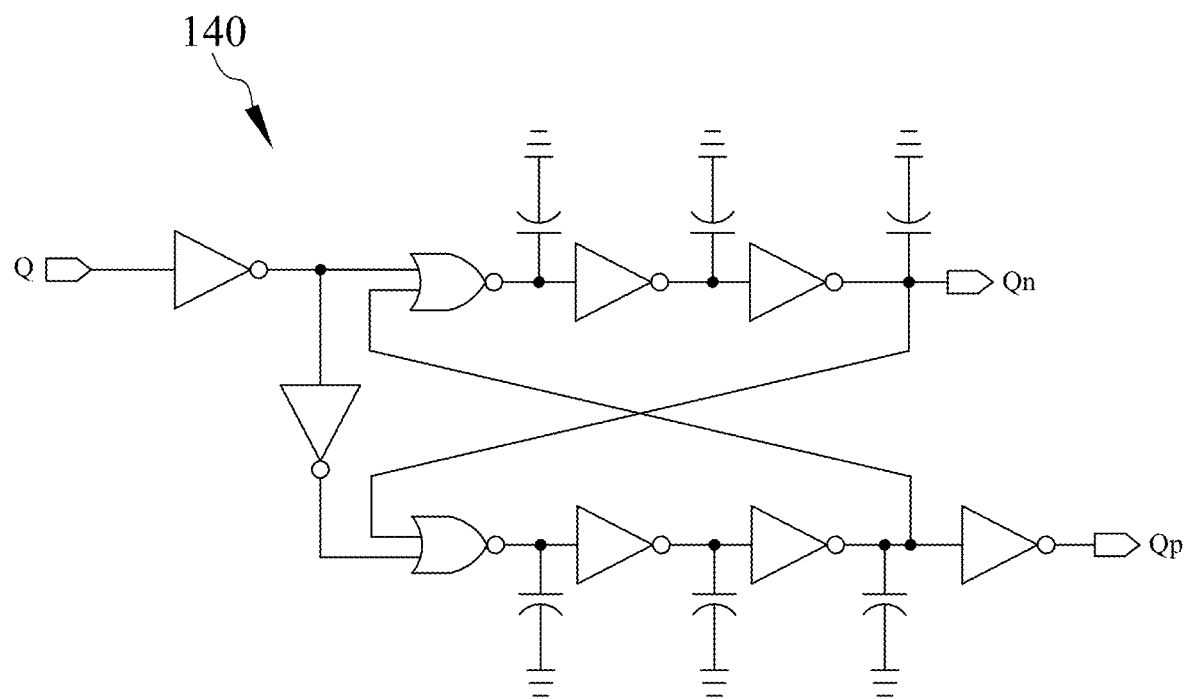
FIG. 3 is a circuit diagram illustrating a dead-time circuit in accordance with one embodiment of the present invention.

With reference to FIGS. 1 and 3, the dead-time circuit 140 is electrically connected with the PWM control circuit 130 to receive the control signal Q and is provided to output a first control signal Qp and a second control signal Qn. As shown in FIG. 3, the dead-time circuit 140 in this embodiment involves multiple inverters connected in series, and each of the inverters connects with a capacitor in the output end for delay. The dead-time circuit 140 is configured to divide the control signal Q into the first control signal Qp and the second control signal Qn without overlap. The first control signal Qp and the second control signal Qn without overlap are provided to turn on/turn off the upper switching elements and the lower switching elements respectively and prevent additional loss caused by the simultaneous turn-on events of the upper and lower switching elements.

Figure 4:
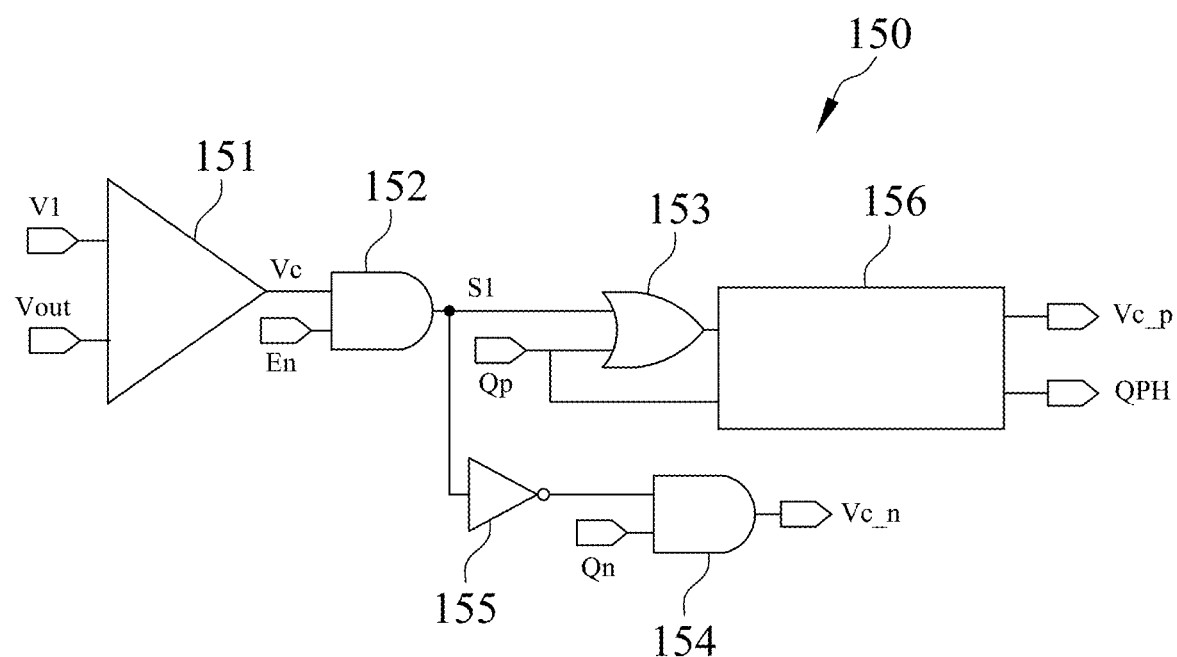
FIG. 4 is a circuit diagram illustrating a light-load control circuit in accordance with one embodiment of the present invention.

With reference to FIGS. 1 and 4, the light-load control circuit 150 is electrically connected with the dead-time circuit 140 for receiving the first control signal Qp and the second control signal Qn. Furthermore, the light-load control circuit 150 is configured to receive the output voltage Vout and a light-load threshold value V1 from the buck conversion circuit 110. The light-load threshold value V1 is determined by the efficiency curve of the DC-DC buck converter 100 and has a fixed value generated by a circuit (not shown). In this embodiment, the light-load control circuit 150 includes a comparator 151, a turn-on AND gate 152, an OR gate 153, a AND gate 154, an inverter 155 and a high voltage (HV) buffer 156.

With reference to FIG. 4, the comparator 151 receives the output voltage Vout and the light-load threshold value V1 and compares them in potential to output a compare signal Vc. When the output voltage Vout is higher than the light-load threshold value V1, the potential of the compare signal Vc is high and that means the DC-DC buck converter 100 is in a light load state. On the other hand, the potential of the compare signal Vc is low while the output voltage Vout is lower than the light-load threshold value V1, and the DC-DC buck converter 100 is not in the light load state.

In order to receive the compare signal Vc and an enable signal En, the turn-on AND gate 152 is electrically connected to the comparator 151. The turn-on AND gate 152 is configured to output a light-load control signal S1 according to the compare signal Vc and the enable signal En which is designed to turn on or turn off the light-load control circuit 150. The light-load control circuit 150 is turned on when the potential of the enable signal En is high, and the potential of the light-load control signal S1 depends on the compare signal Vc. Oppositely, when the potential of the enable signal En is low, the light-load control circuit 150 is turned off and the potential of the light-load control signal S1 is low regardless pf the potential of the compare signal Vc. In other embodiments, if the light-load control circuit 150 is turned on continuous, the turn-on AND gate 152 is not necessary in the light-load control circuit 150.

With reference to FIGS. 1 and 4, the OR gate 153 is configured to electrically connect to the turn-on AND gate 152, receive the light-load control signal S1 from the turn-on AND gate 152, receive the first control signal Qp from the dead-time circuit 140 and output an upper light-load control signal Vc_p via the HV buffer 156. The potential of the upper light-load control signal Vc_p is controlled by the light-load control signal S1 and the first control signal Qp, and transmitted to the gates of the first upper switching element 111a to turn on or turn off the first upper switching element 111a. Additionally, the HV buffer 156 is provided to receive the first control signal Qp and output a first high voltage control signal QPH at the same potential to the first control signal Qp. The first high voltage control signal QPH is transmitted to the gates of the second upper switching element 111b to control the turn-on or turn-off of the second upper switching element 111b.

With reference to FIG. 4, the potential of the light-load control signal S1 is high while the DC-DC buck converter 100 is in the light load state. And regardless of the potential of the first control signal Qp, the upper light-load control signal Vc_p output from the OR gate 153 is high and is able to turn off the first upper switching element 111a, so that the first upper switching element 111a does not operate in the buck conversion circuit 110. On the contrary, the potential of the light-load control signal S1 is low when the DC-DC buck converter 100 is not in the light load state. Meanwhile, the upper light-load control signal Vc_p and the first control signal Qp are at the same potential and the first upper switching element 111a can operate in the buck conversion circuit 110. The number of the PMOS power transistors used in the DC-DC buck converter 100 can be reduced when the load is light, so that can reduce the whole width of the PMOS power transistors and the switching loss to improve the conversion efficiency.

With reference to FIGS. 1 and 4, the AND gate 154 is electrically connected to the turn-on AND gate 152 through the inverter 155. The AND gate 154 is configured to receive the inverted light-load control signal S1 and the second control signal Qn, and output a lower light-load control signal Vc_n based on the inverted light-load control signal S1 and the second control signal Qn. The lower light-load control signal Vc_n is transmitted to the first lower switching element 111c to turn on/off the lower light-load switching element 111c. The second control signal Qn output from the dead-time circuit 140 is directly transmitted to the second lower switching element 111d to turn on/off the second lower switching element 111d.

With reference to FIG. 4, when the DC-DC buck converter 100 in the light load state, the potential of the light-load control signal S1 is high, the potential of the inverted light-load control signal S1 is low, and the potential of the lower light-load control signal Vc_p output from the AND gate 154 is low regardless of the potential of the second control signal Qn. As a result, the first lower switching element 111c is turn off and unable to operate in the buck conversion circuit 110. In another aspect, when the DC-DC buck converter 100 is not in the light load state, the potential of the inverted light-load control signal S1 is high, and meanwhile, the potentials of the lower light-load control signal Vc_n and the second control signal Qn are the same to let the first lower switching element 111c operate in the buck conversion circuit 110. For these reasons, the DC-DC buck converter 100 under light load can reduce the whole width of the NMOS power transistors by using less NMOS power transistors and can reduce the switching loss to enhance the conversion efficiency.

In the embodiment without the turn-on AND gate 152, the OR gate 153 is designed to receive the compare signal Vc and the first control signal Qp from the comparator 151 directly and output the upper light-load control signal V_cp according to the compare signal Vc and the first control signal Qp. The AND gate 154 is designed to directly receive the inverted compare signal Vc and the second control signal Qn from the inverter 155 and output the lower light-load control signal Vc_n based on the inverted compare signal Vc and the second control signal Qn. And when the DC-DC buck converter 100 of this embodiment is in the light-load state, the upper light-load control signal Vc_p and the lower light-load control signal Vc_n are also provided to turn off the first upper switching element 111a and the first lower switching element 111c respectively for loss reduction and conversion efficiency improvement.

The present invention utilizes the light-load control circuit 150 to determine the load state of the DC-DC buck converter 100, and output the upper light-load control signal Vc_p and the lower light-load control signal Vc_n to turn off some upper switching elements and some lower switching elements so can improve the conversion efficiency of the DC-DC buck converter 100 when the load is light.

The scope of the present invention is only limited by the following claims. Any alternation and modification without departing from the scope and spirit of the present invention will become apparent to those skilled in the art.

What is claimed is:
1. A DC-DC buck converter comprising:
a buck conversion circuit including a switching circuit and a LC circuit, the switching circuit includes a plurality of upper switching elements and a plurality of lower switching elements, the upper switching elements are electrically connected to the lower switching elements, the LC circuit is electrically connected to the switching circuit and configured to output an output voltage;
a PWM control circuit coupled to the buck conversion circuit, the PWM control circuit is configured to generate a control signal which is provided to control the upper and lower switching elements; and
a light-load control circuit coupled to the PWM control circuit and the buck conversion circuit, the light-load control circuit is configured to receive the output voltage, the control signal, and a light-load threshold value and determine whether the DC-DC buck converter is in a light load state according to the output voltage and the light-load threshold value, wherein when the DC-DC buck converter is in the light load state, the light-load circuit is configured to turn off at least one of the upper switching elements and at least one of the lower switching elements so as to inhibit the at least one turned-off upper and at least one turned-off lower switching elements from operating in buck conversion.

2. The DC-DC buck converter in accordance with claim 1, wherein each of the upper switching elements is a PMOS power transistor, and each of the lower switching elements is a NMOS power transistor.

3. The DC-DC buck converter in accordance with claim 1, wherein the switching circuit includes a first upper switching element, a second upper switching element, a first lower switching element and a second lower switching element, the first and second upper switching elements are configured to receive a input voltage and electrically connect to the LC circuit, and the first and second lower switching elements are electrically connected to the LC circuit and a ground end, wherein the LC circuit is charged by the input voltage when the first or second switching element is turned on, and the LC circuit is discharged when the first or second lower switching element is turned on.

4. The DC-DC buck converter in accordance with claim 2, wherein the switching circuit includes a first upper switching element, a second upper switching element, a first lower switching element and a second lower switching element, the first and second upper switching elements are configured to receive a input voltage and electrically connect to the LC circuit, and the first and second lower switching elements are electrically connected to the LC circuit and a ground end, wherein the LC circuit is charged by the input voltage when the first or second switching element is turned on, and the LC circuit is discharged when the first or second lower switching element is turned on.

5. The DC-DC buck converter in accordance with claim 1, wherein the LC circuit includes an inductor and a capacitor, two ends of the inductor are respectively electrically connected to the switching circuit and an output node, and two ends of the capacitor are respectively electrically connected to the output node and a ground end.

6. The DC-DC buck converter in accordance with claim 5, wherein the buck conversion circuit further includes a voltage divider circuit configured to output a reference signal, the voltage divider circuit includes a first resistor and a second resistor which are connected in series between the output node and the ground end.

7. The DC-DC buck converter in accordance with claim 6 further comprising an error amplifier, wherein the error amplifier is electrically connected to the voltage divider circuit for receiving the reference signal and is configured to output an error amplifying signal.

8. The DC-DC buck converter in accordance with claim 7, wherein the PWM control circuit includes a signal generator, a comparator and a latch, the signal generator is configured to generate a triangular wave signal and a clock signal, the comparator is electrically connected to the error amplifier and the signal generator for receiving the error amplifying signal and the triangular wave signal and is configured to output a square wave signal, the latch is electrically connected to the comparator and the signal generator for receiving the square signal and the clock signal and is configured to output the control signal.

9. The DC-DC buck converter in accordance with claim 1 further comprising a dead-time circuit, wherein the dead-time circuit is electrically connected to the PWM control circuit for receiving the control signal and is configured to output a first control signal and a second control signal, and wherein the light-load control circuit is electrically connected to the dead-time circuit for receiving the first and second control signals.

10. The DC-DC buck converter in accordance with claim 9, wherein the light-load control circuit includes a comparator, an OR gate and a AND gate, the comparator is configured to receive the output voltage and the light-load threshold value and output a compare signal, the OR gate is configured to receive the compare signal and the first control signal and output a upper light-load control signal used to turn off at least one of the upper switching elements in the light load state, the AND gate is configured to receive the compare signal and the second control signal and output a lower light-load control signal used to turn off at least one of the lower switching elements in the light load state.

11. The DC-DC buck converter in accordance with claim 10, wherein the light-load control circuit further includes a inverter, the inverter is electrically connected to the comparator for receiving the compare signal and is configured to output the inverted compare signal, and wherein the AND gate is configured to receive the inverted compare signal.

12. The DC-DC buck converter in accordance with claim 3 further comprising a dead-time circuit, wherein the dead-time circuit is electrically connected to the PWM control circuit for receiving the control signal and is configured to output a first control signal and a second control signal, and wherein the light-load control circuit is electrically connected to the dead-time circuit for receiving the first and second control signals.

13. The DC-DC buck converter in accordance with claim 12, wherein the light-load control circuit includes a comparator, an OR gate and a AND gate, the comparator is configured to receive the output voltage and the light-load threshold value and output a compare signal, the OR gate is configured to receive the compare signal and the first control signal and output a upper light-load control signal used to turn off at least one of the upper switching elements in the light load state, the AND gate is configured to receive the compare signal and the second control signal and output a lower light-load control signal used to turn off at least one of the lower switching elements in the light load state.

14. The DC-DC buck converter in accordance with claim 13, wherein the light-load control circuit further includes a inverter, the inverter is electrically connected to the comparator for receiving the compare signal and is configured to output the inverted compare signal, and wherein the AND gate is configured to receive the inverted compare signal.

15. The DC-DC buck converter in accordance with claim 4 further comprising a dead-time circuit, wherein the dead-time circuit is electrically connected to the PWM control circuit for receiving the control signal and is configured to output a first control signal and a second control signal, and wherein the light-load control circuit is electrically connected to the dead-time circuit for receiving the first and second control signals.

16. The DC-DC buck converter in accordance with claim 15, wherein the light-load control circuit includes a comparator, an OR gate and a AND gate, the comparator is configured to receive the output voltage and the light-load threshold value and output a compare signal, the OR gate is configured to receive the compare signal and the first control signal and output a upper light-load control signal used to turn off at least one of the upper switching elements in the light load state, the AND gate is configured to receive the compare signal and the second control signal and output a lower light-load control signal used to turn off at least one of the lower switching elements in the light load state.

17. The DC-DC buck converter in accordance with claim 16, wherein the light-load control circuit further includes a inverter, the inverter is electrically connected to the comparator for receiving the compare signal and is configured to output the inverted compare signal, and wherein the AND gate is configured to receive the inverted compare signal.

* * * * *